R. M. WAHLEN.
GREASE CUP.
APPLICATION FILED JUNE 16, 1913.

1,099,526.

Patented June 9, 1914.

Witnesses:
L. W. Cook
Donna Starrett

RALPH M. WAHLEN,
INVENTOR.
By George G. Oltsch
ATTORNEY.

UNITED STATES PATENT OFFICE.

RALPH MILTON WAHLEN, OF ELKHART, INDIANA.

GREASE-CUP.

1,099,526.     Specification of Letters Patent.     Patented June 9, 1914.

Application filed June 16, 1913. Serial No. 773,885.

*To all whom it may concern:*

Be it known that I, RALPH M. WAHLEN, a citizen of the United States, residing at Elkhart, in the county of Elkhart and State of Indiana, have invented certain new and useful Improvements in Grease-Cups, of which the following is a specification.

The invention relates generally to an improvement in grease cups, and particularly to a means for connecting the grease holding cup and expressing plunger in a manner to permit a simple and speedy relative adjustment for forcing the grease to the point of use.

The main object of the present invention is the provision of a grease cup in which the connection between the cup proper and plunger is arranged wholly within the cup and constructed to permit desired adjustment through a relatively longitudinal movement of the parts, the connection providing for holding or locking the parts in practically any desired adjustment.

The invention in its preferred form of details will be described in the following specification, reference being had particularly to the accompanying drawings in which:—

Figure 1:
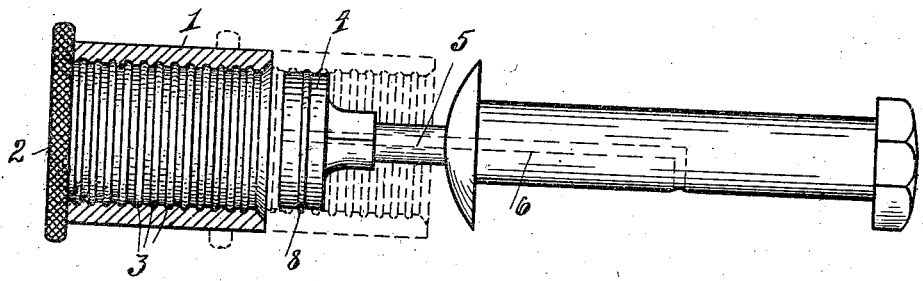
Figure 2:
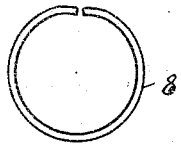
Figure 3:
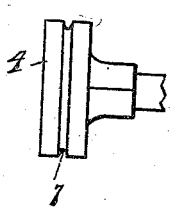
Figure 4:
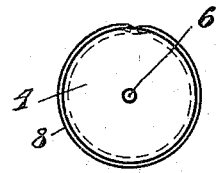

Figure 1 is a view in elevation partly in section illustrating the invention applied to a conventional form of grease cup, shown in use with a bolt connection for automobile springs. Fig. 2 is an elevation of the spring locking ring. Fig. 3 is a broken edge view of the plunger. Fig. 4 is an elevation of the plunger, the locking ring being shown in place.

Referring particularly to the accompanying drawings, the improved grease cup is shown as including a cup proper 1, of hollow cylindrical form, provided with a terminal milled head 2, of increased diameter. The inner surface of the cylindrical wall of the cup is formed with a series of annular channels 3, said channels being preferably arranged in regular spaced relation throughout the length of the wall, each channel being wholly independent of and in parallelism throughout with every other channel. The plunger comprises a disk like body 4 having a stem 5 projecting centrally from one plane face of the disk. The disk and stem are formed with a grease channel 6, opening wholly therethrough from end to end, to provide a passage for the lubricant, as will be evident.

As is usual in grease cups, the cup proper 1 is designed to be supplied with a suitable quantity of the lubricant, and adjusted on to the plunger, the movement of the latter lengthwise the cup toward the head serving to express the lubricant through the channel 6 to the desired point of application. The connection usually employed between the cup and plunger is that of a screw threaded connection, which not only requires time in its adjustment, but does not provide against independent movement of the parts through the jar of the machinery to which the grease cup is applied.

It is therefore the primary object of the invention to provide such a connection between the plunger and cup proper that they may be relatively adjusted by a simple endwise movement, and locked in the adjusted position against accidental movement. In carrying out this detail of the improvement, I provide the plunger 4 with an annular recess or channel 7, preferably arranged centrally of the peripheral wall of said plunger. A spring ring 8 is designed to seat in the channel 7, the normal resiliency of said ring being such that its inner diameter is slightly less than the maximum diameter of the plunger. The ring is split, or divided, to permit its compression when in place, it being understood that normally its exterior diameter is somewhat greater than the maximum diameter of the channels 3 in the cup 1.

With the plunger in position in the cup, it is obvious that the ring 8 will engage one of the channels 3 in the cup, while being retained in the channel 7 in the plunger. The resiliency of the ring will maintain this connection against accidental displacement. In the relative adjustment of the plunger and cup, to express the lubricant from the latter, a simple longitudinal movement only of the cup is necessary, the pressure forcing the spring ring within the channel of the plunger to permit the movement of the head to the extent desired, the ring again engaging the appropriate channel 3 in the cup to lock the parts. It will of course be understood that the channels 3 in the cup are rounded in sectional contour to permit a comparatively easy separation of the ring therefrom under pressure.

From the above description it will be obvious that I provide a means whereby the relative adjustment of the cup and plunger may be effected by a simple longitudinal movement of the parts, the means serving also as a lock to prevent accidental movement of the parts after adjustment.

The invention residing primarily in the adjusting and locking connection, it is to be understood that the particular form of the grease cup is immaterial, and that I contemplate the use of the improvement with any type of grease cup with which it may be employed.

What is claimed is:—

1. A grease cup including a cup proper interiorly formed with a series of annular channels, a cup-plunger operative within the cup, and a spring ring carried by the plunger to coöperate with the channels in the cup.

2. A grease cup including a cup proper interiorly formed with a series of annular parallel channels, a plunger operative within the cup, and formed with an annular channel, and a divided spring ring seated in the channel in the plunger.

3. A grease cup including a cup proper internally formed with a series of annular channels, a cup-plunger operative within the cup, and yielding means carried by the plunger for coöperation with the channels in the cup.

4. As an article of manufacture, a grease cup comprising a body member and a cover member telescoping one within the other, grooves formed in the adjacent walls of said members adapted to register with each other, and a resilient open ring carried in one of said grooves and adapted to expand partly into the registering grooves to hold the members together.

In testimony whereof I affix my signature in presence of two witnesses.

RALPH MILTON WAHLEN.

Witnesses:
L. W. COOK,
GEORGE J. OLTSCH.